United States Patent
Rose et al.

(10) Patent No.: US 7,614,653 B2
(45) Date of Patent: Nov. 10, 2009

(54) PRE-FOLDED AIRBAG CUSHION WITH OPTIONAL VENTING FOR OUT-OF-POSITION CONDITIONS

(75) Inventors: Larry D. Rose, South Weber, UT (US); Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 325 days.

(21) Appl. No.: 11/528,265

(22) Filed: Sep. 27, 2006

(65) Prior Publication Data

US 2008/0073891 A1 Mar. 27, 2008

(51) Int. Cl.
*B60R 21/30* (2006.01)

(52) U.S. Cl. .................................. 280/739; 280/743.2

(58) Field of Classification Search .............. 280/743.2, 280/739, 740
See application file for complete search history.

(56) References Cited

U.S. PATENT DOCUMENTS

| | | | |
|---|---|---|---|
| 5,016,913 A | 5/1991 | Nakajima et al. | |
| 5,172,933 A | 12/1992 | Strasser | |
| 5,246,250 A | 9/1993 | Wolanin et al. | |
| 5,280,953 A | 1/1994 | Wolanin et al. | 280/739 |
| 5,306,043 A * | 4/1994 | Mihm et al. | 280/732 |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,603,526 A | 2/1997 | Buchanan | |
| 5,931,497 A | 8/1999 | Fischer | |
| 6,056,318 A | 5/2000 | Braunschadel | |
| 6,095,557 A | 8/2000 | Takimoto et al. | |
| 6,126,196 A | 10/2000 | Zimmerman | |
| 6,139,048 A | 10/2000 | Braunschädel | 280/728.1 |
| 6,183,003 B1 | 2/2001 | Matsuhashi et al. | |
| 6,206,408 B1 | 3/2001 | Schneider | |
| 6,247,726 B1 | 6/2001 | Ryan | |
| 6,371,509 B1 | 4/2002 | Ellerbrok et al. | |
| 6,398,258 B2 | 6/2002 | Hamada et al. | |
| 6,631,921 B1 | 10/2003 | Drossler et al. | |
| 6,631,922 B2 | 10/2003 | Hess et al. | 280/730.2 |
| 6,648,371 B2 | 11/2003 | Vendely et al. | 280/739 |
| 6,746,045 B2 | 6/2004 | Short et al. | |

(Continued)

FOREIGN PATENT DOCUMENTS

DE 196 40 322 3/1996

(Continued)

OTHER PUBLICATIONS

Notice of Allowance issued Apr. 2, 2009 in co-pending U.S. Appl. No. 11/295,953.

(Continued)

*Primary Examiner*—Faye M. Fleming
(74) *Attorney, Agent, or Firm*—Sally J Brown; Stoel Rives LLP

(57) ABSTRACT

An airbag cushion is disclosed for use in automotive protective systems. The airbag cushion includes at least one closeable vent for re-directing gas out of the cushion when an obstruction is encountered. The airbag cushion includes a fold for maintaining the cord in a slack condition.

40 Claims, 9 Drawing Sheets

U.S. PATENT DOCUMENTS

| | | | |
|---|---|---|---|
| 6,773,027 | B2 | 8/2004 | Bohn et al. |
| 6,773,030 | B2 | 8/2004 | Fischer |
| 6,290,257 | B1 | 9/2004 | Bunce et al. ............... 280/739 |
| 6,832,778 | B2 | 12/2004 | Pinsenschaum et al. |
| 6,863,304 | B2 | 3/2005 | Reiter et al. |
| 6,918,613 | B2 | 7/2005 | Short et al. |
| 6,932,385 | B2 | 8/2005 | Hawthorn et al. |
| 6,971,671 | B2 | 12/2005 | Schneider et al. |
| 7,059,634 | B2 | 6/2006 | Bossecker et al. ........... 280/739 |
| 7,083,191 | B2 | 8/2006 | Fischer |
| 7,083,192 | B2 | 8/2006 | Fischer et al. |
| 7,210,702 | B2 | 5/2007 | Soderquist |
| 7,237,802 | B2 | 7/2007 | Rose et al. |
| 7,261,319 | B2 | 8/2007 | DePottey et al. |
| 7,328,915 | B2* | 2/2008 | Smith et al. ................. 280/739 |
| 7,347,450 | B2* | 3/2008 | Williams et al. ............ 280/739 |
| 7,360,789 | B2* | 4/2008 | Bito ....................... 280/743.1 |
| 7,364,192 | B2* | 4/2008 | Braun et al. ................. 280/739 |
| 2003/0020266 | A1 | 1/2003 | Vendely et al. |
| 2003/0020268 | A1 | 1/2003 | Reiter et al. |
| 2003/0057691 | A1* | 3/2003 | Tokita et al. ............. 280/743.2 |
| 2003/0127839 | A1 | 7/2003 | Jenkins |
| 2003/0209895 | A1 | 11/2003 | Gu |
| 2003/0214125 | A1 | 11/2003 | Schneider et al. |
| 2004/0012179 | A1 | 1/2004 | Pinsenschaum et al. |
| 2004/0056459 | A1 | 3/2004 | Kassman et al. |
| 2004/0090054 | A1 | 5/2004 | Bossecker et al. |
| 2004/0130135 | A1 | 7/2004 | Ekdahl |
| 2004/0188990 | A1 | 9/2004 | Short et al. |
| 2004/0256842 | A1 | 12/2004 | Breed et al. |
| 2005/0052008 | A1 | 3/2005 | Rose et al. |
| 2005/0098990 | A1 | 5/2005 | Pinsenschaum et al. |
| 2005/0236822 | A1 | 10/2005 | Rose et al. |
| 2005/0248137 | A1 | 11/2005 | Delventhal et al. |
| 2006/0071461 | A1 | 4/2006 | Williams et al. |
| 2006/0071462 | A1 | 4/2006 | Smith et al. |
| 2006/0151979 | A1 | 7/2006 | DePottey et al. |
| 2006/0197327 | A1 | 9/2006 | Maripudi et al. |
| 2006/0202454 | A1 | 9/2006 | Parizal et al. |
| 2007/0052222 | A1 | 3/2007 | Higuchi et al. |
| 2007/0108750 | A1 | 5/2007 | Bauer et al. |
| 2007/0126218 | A1 | 6/2007 | Schnieder et al. |
| 2007/0126219 | A1 | 6/2007 | Williams |
| 2007/0132222 | A1 | 6/2007 | Thomas et al. |
| 2007/0205590 | A1 | 9/2007 | Klinkenberger et al. |
| 2008/0007038 | A1 | 1/2008 | Fischer et al. |
| 2008/0018086 | A1 | 1/2008 | Ford et al. |
| 2008/0023950 | A1 | 1/2008 | Kalczynski et al. |
| 2008/0023959 | A1 | 1/2008 | Crawford |
| 2008/0073890 | A1 | 3/2008 | Williams et al. |
| 2008/0073891 | A1 | 3/2008 | Rose et al. |
| 2008/0073892 | A1 | 3/2008 | Rose et al. |
| 2008/0073893 | A1 | 3/2008 | Schneider |
| 2008/0079250 | A1 | 4/2008 | Boyle et al. |
| 2008/0303256 | A1 | 12/2008 | Williams |
| 2009/0039630 | A1 | 2/2009 | Schneider et al. |

FOREIGN PATENT DOCUMENTS

| | | |
|---|---|---|
| JP | 05085295 | 4/1993 |
| JP | 2001-158315 | 6/2001 |

OTHER PUBLICATIONS

Amendment and Response to Office Action filed Apr. 20, 2009 in co-pending U.S. Appl. No. 11/296,031.
Notice of Allowance issued Mar. 23, 2009 in co-pending U.S. Appl. No. 11/528,118.
Office Action issued Mar. 19, 2009 in co-pending U.S. Appl. No. 11/528,266.
Amendment and Response to Office Action filed Apr. 17, 2009 in co-pending U.S. Appl. No. 11/589,316.
Amendment and Response to Office Action filed Apr. 21, 2009 in co-pending U.S. Appl. No. 11/758,419.
Preliminary Amendment filed Jun. 8, 2007 in co-pending U.S. Appl. No. 11/589,316.
Office Action issued Nov. 17, 2008 in co-pending U.S. Appl. No. 11/589,316.
Interview Summary issued Dec. 19, 2008 in co-pending U.S. Appl. No. 11/589,316.
Office Action issued Mar. 15, 2006 in co-pending U.S. Appl. No. 10/832,843.
Response to First Office Action filed in co-pending U.S. Appl. No. 10/832,843.
Interview Summary issued Jun. 15, 2006 in co-pending U.S. Appl. No. 10/832,843.
Notice of Allowance issued Jun. 22, 2006 in co-pending U.S. Appl. No. 10/832,843.
Request for Continued Examination filed Sep. 20, 2006 in co-pending U.S. Appl. No. 10/832,843.
Notice of Allowance issued Oct. 3, 2006 in co-pending U.S. Appl. No. 10/832,843.
Office Action issued Sep. 27, 2006 in co-pending U.S. Appl. No. 10/959,387.
Interview Summary issued Jan. 23, 2007 in co-pending U.S. Appl. No. 10/959,387.
Amendment and Response to Office Action filed Feb. 20, 2007 in co-pending U.S. Appl. No. 10/959,387.
Office Action issued May 2, 2007 in co-pending U.S. Appl. No. 10/959,387.
Amendment and Response to Office Action filed Aug. 7, 2007 in co-pending U.S. Appl. No. 10/959,387.
Notice of Allowance issued Oct. 5, 2007 in co-pending U.S. Appl. No. 10/959,387.
Office Action issued Jun. 8, 2007 in co-pending U.S. Appl. No. 11/296,031.
Amendment and Response to Office Action filed Dec. 4, 2007 in co-pending U.S. Appl. No. 11/296,031.
Office Action issued Apr. 21, 2008 in co-pending U.S. Appl. No. 11/296,031.
Amendment and Response to Office Action filed Jul. 21, 2008 in co-pending U.S. Appl. No. 11/296,031.
Office Action issued Oct. 21, 2008 in co-pending U.S. Appl. No. 11/296,031.
Preliminary Amendment filed Mar. 10, 2005 in co-pending U.S. Appl. No. 10/959,256.
Office Action issued Nov. 15, 2006 in co-pending U.S. Appl. No. 10/959,256.
Interview Summary issued Jan. 23, 2007 in co-pending U.S. Appl. No. 10/959,256.
Amendment and Response to Office Action filed Feb. 15, 2007 in co-pending U.S. Appl. No. 10/959,256.
Office Action issued May 21, 2007 in co-pending U.S. Appl. No. 10/959,256.
Amendment and Response to Office Action filed Aug. 16, 2007 in co-pending U.S. App. No. 10/959,256.
Notice of Allowance issued Nov. 27, 2007 in co-pending U.S. Appl. No. 10/959,256.
Office Action issued Jan. 2, 2009 in co-pending U.S. Appl. No. 11/528,042.
Office Action issued Jul. 11, 2008 in co-pending U.S. Appl. No. 11/528,118.
Amendment and Response to Office Action filed Nov. 24, 2008 in co-pending U.S. Appl. No. 11/528,118.
Interview Summary issued Dec. 15, 2008 in co-pending U.S. Appl. No. 11/528,118.
Notice of Allowance issued Feb. 10, 2009 in co-pending U.S. Appl. No. 11/528,118.
Office Action issued Jun. 30, 2008 in co-pending U.S. Appl. No. 11/528,266.
Amendment and Response to Office Action filed Dec. 1, 2008 in co-pending U.S. Appl. No. 11/528,266.
Interview Summary issued Dec. 16, 2008 in co-pending U.S. Patent Application No. 11/528,266.

Notice of Allowance issued Jan. 14, 2009 in co-pending U.S. Appl. No. 11/528,266.
Summary of Interview filed Jan. 16, 2009 in co-pending U.S. Appl. No. 11/528,266.
Office Action issued Dec. 2, 2008 in co-pending U.S. Appl. No. 11/758,419.
Office Action issued Apr. 07, 2008 in co-pending U.S. Appl. No. 11/295,953.
Office Action issued Jul. 1, 2008 in co-pending U.S. Appl. No. 11/295,953.
Amendment and Response to Office Action filed Dec. 1, 2008 in co-pending U.S. Appl. No. 11/295,953.
Office Action issued Sep. 26, 2006 in co-pending U.S. Appl. No. 11/031,394.
Interview Summary issued Jan. 23, 2007 in co-pending U.S. Appl. No. 11/031,394.
Amendment and Response to Office Action filed Mar. 26, 20027 in co-pending U.S. Appl. No. 11/031,394.
Notice of Allowance issued May 7, 2007 in co-pending U.S. Appl. No. 11/031,394.
Office Action issued Jun. 25, 2007 in co-pending U.S. Appl. No. 11/031,394.
Notification of Transmittal of the International Search Report and the Written Opinion of the International Searching Authority issued Oct. 19, 2006 in International Application No. PCT/US2005/025416.
Notification of Transmittal of the International Search Report and the Written Opinion of the International Searching Authority issued Dec. 15, 2006 in International Application No. PCT/US2005/027255.
Notification of Transmittal of the International Search Report and the Written Opinion of the International Searching Authority issued Aug. 20, 2007 in International Application No. PCT/US2006/045367.
Notification of Transmittal of the International Search Report and the Written Opinion of the International Searching Authority issued Sep. 5, 2007 in International Application No. PCT/US2006/045441.
Notification of Transmittal of the International Search Report and the Written Opinion of the International Searching Authority issued Mar. 9, 2007 in International Application No. PCT/US2005/038175.
Notification of Transmittal of the International Search Report and the Written Opinion of the International Searching Authority issued Oct. 22, 2008 in International Application No. PCT/US2008/071337.
Notification of Transmittal of the International Search Report and the Written Opinion of the International Searching Authority issued Aug. 15, 2008 in International Application No. PCT/US2008/060226.

* cited by examiner

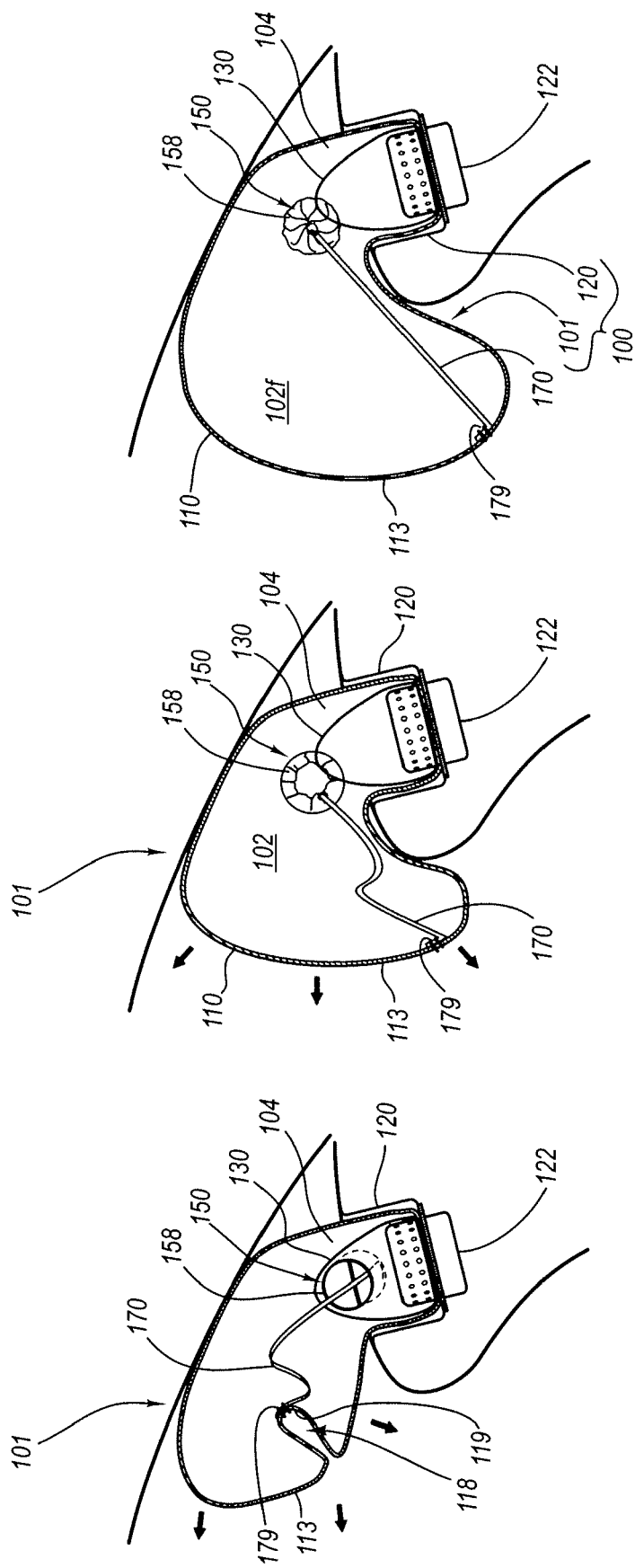

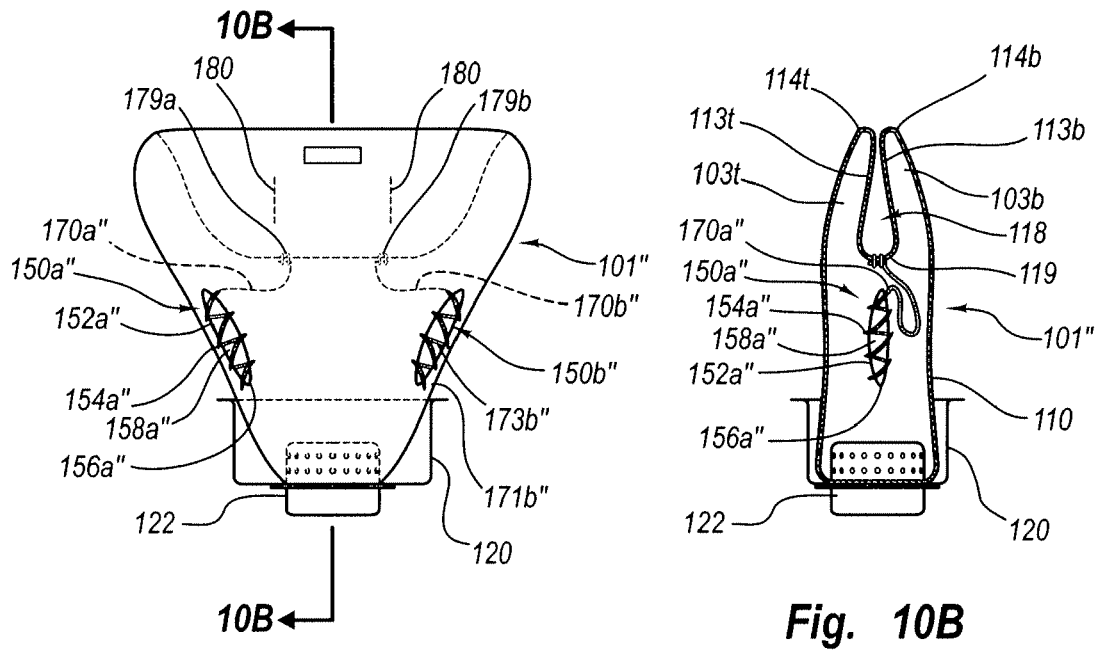
Fig. 10A
Fig. 10B
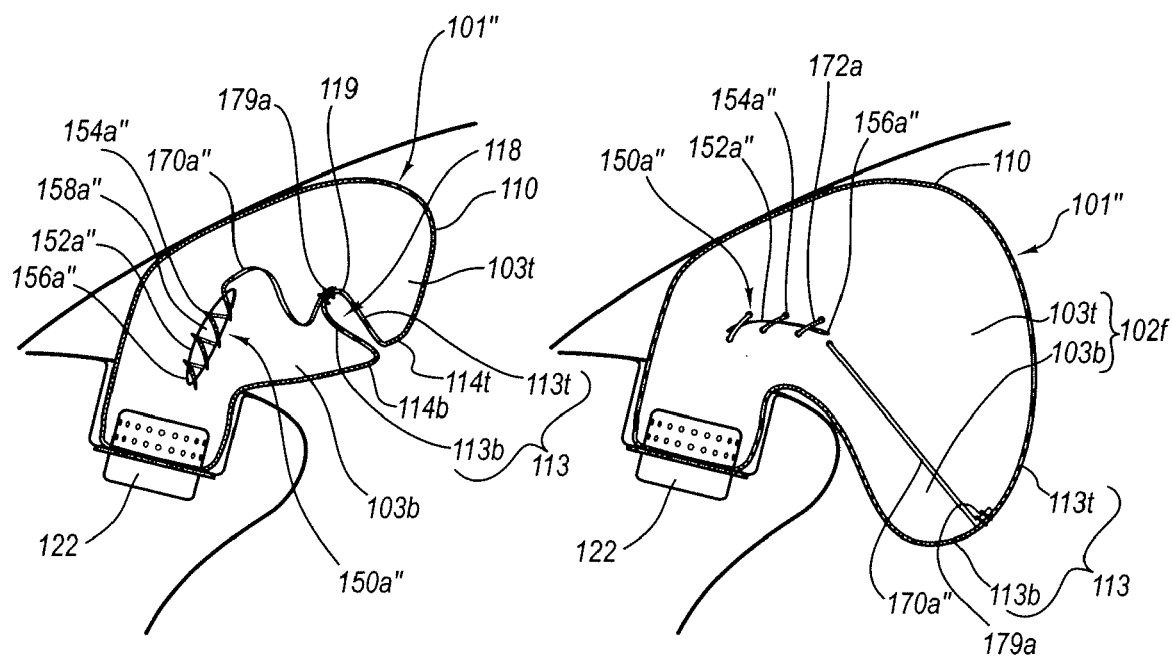
Fig. 11A
Fig. 11B

PRE-FOLDED AIRBAG CUSHION WITH OPTIONAL VENTING FOR OUT-OF-POSITION CONDITIONS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

FIG. 2A is a cross-sectional view of an embodiment of a deploying airbag cushion.

FIG. 2B is a cross-sectional view of the deploying airbag cushion of FIG. 2A.

FIG. 2C is a cross-sectional view of an embodiment of a deploying airbag cushion of FIGS. 2A and 2B.

FIG. 10A is a top plan view of another embodiment of an airbag which has closeable laced vents. The airbag has its front portion folded and held in place by breakaway stitching in preparation for being further folded for placement in an automobile.

FIG. 10B is a cross-sectional view of the partially folded airbag shown in FIG. 10A with the front portion divided into a top section and a bottom section by a fold. The cross-sectional view is taken along cutting line 10B-10B in FIG. 10A.

FIG. 11A is a cross-sectional view of the airbag shown in FIGS. 10A-10B as it is deployed which shows the slack in the cord due to the fold during initial deployment.

FIG. 11B is a cross-sectional view of the airbag after it is fully deployed.

Figure 1:
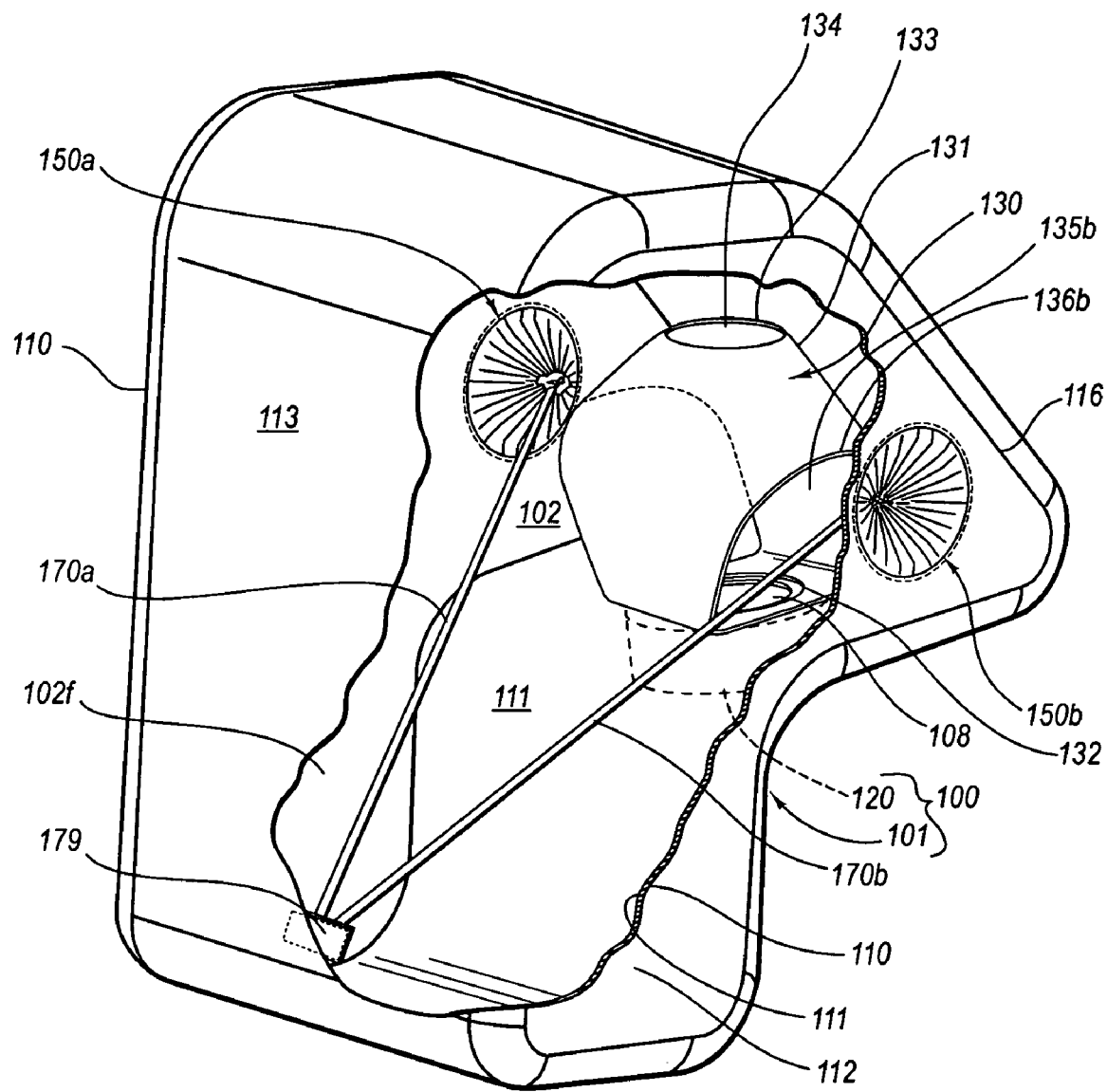
FIG. 1 is a perspective view of an airbag cushion with a partial cut-away to show the cords, cinch vents and a diffuser.

| Index of Elements Identified in the Drawings | |
|---|---|
| 30 | occupant |
| 100 | airbag module |
| 101 | airbag cushion |
| 102 | interior of the airbag cushion 101 |
| 102f | front portion of interior 102 |
| 103t | top section of front portion 102f |
| 103b | bottom section of front portion 102f |
| 108 | throat |
| 110 | membrane |
| 111 | interior surface of airbag cushion membrane |
| 112 | exterior surface of the airbag cushion membrane |
| 113 | face surface |
| 114 | tips |
| 116 | seam |
| 118 | fold |
| 119 | base of fold |
| 120 | airbag module housing |
| 122 | inflator |
| 130 | diffuser |
| 131 | material |
| 132 | opening |
| 133 | perimeter of direct opening 134 |
| 134 | direct opening of diffuser |
| 135 | side openings |
| 136 | perimeter of side openings 135 |
| 150 | cinch vent, laced vent or other closeable vent |
| 151 | rim or diameter of cinch tube and sides edges of laced vent |
| 152 | tube of cinch vent and sides of laced vent |
| 153 | cord holder of vent such as a sleeve |
| 154 | holes in cord holder of cinch vent and holes of laced vent |
| 156 | ends of laced vent |
| 158 | vent apertures |
| 160 | fixed vent |
| 170 | control cord |
| 171 | stitching or retention knot |
| 172 | stopper |
| 173 | vent portion |
| 178 | teeth |
| 179 | cord attachment |
| 180 | tack stitch |

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas referred to as an optionally closeable vent for out-of-position (OOP) conditions such as a cinch vent or a closeable vent. Each closeable vent may be closed via a component such as a control cord. Numerous embodiments of control cords are disclosed including control cords configured to incrementally close the vent. The cord may be connected at one end to a vent and at an opposing end elsewhere within or on the cushion. A diffuser may also be positioned in the cushion to optimize the flow of gas out of the closeable vents. It is desirable to include a diffuser in most embodiments of the cushion due to the ability of a diffuser to enable the rapid escape of the gas out of the cushion via the closeable vents.

If an occupant is in close proximity to the deploying airbag and restricts normal inflation, the closeable vent remains open and allows gas to rapidly escape. If the occupant is in a normal position and inflation is unrestricted, the tension pulls on the cord to quickly close the closeable vent. Closure retains gas for normal occupant restraint. Thus, the closeable vent may be used as a variable feature in out-of-position conditions and in normal restraint conditions. In this manner, the airbag cushion is sensitive to obstructive expansion of the cushion.

With reference now to the accompanying figures, particular embodiments of the invention will now be described in greater detail. One embodiment of airbag module 100 is shown in FIG. 1 and FIGS. 2A-2C comprising an airbag cushion 101 and a housing 120. FIG. 1 is a perspective view which shows housing 120 of airbag module 100 having an inflator 122 (not shown in FIG. 1) delivering gas into an airbag cushion 101 of airbag module 100 via a diffuser 130 within airbag cushion 101. Closeable vents 150a-b are closed as vent portions 173a-b of control cords 170a-b have been pulled taut by expansion of the cushion due to the pressure of the gas in airbag cushion 101.

Some of the structures of the airbag cushion 101 are best seen with reference to FIGS. 1 and 2A-2C while FIGS. 3A-3C, and FIGS. 4A-4C show only some components such as diffuser 130, closeable vents 150, fixed vents 160 and cords 170. Airbag cushion 101 has an interior 102 with front portion 102f. Airbag cushion 101 also has a membrane 110 with an interior surface 111 and exterior surface 112. Vent apertures 158 in membrane 110 provides an opening for gas to exit interior 102 of airbag cushion 101 via closeable vents 150. Gas enters interior 102 via another opening in the membrane 110, throat 108.

Optional diffuser 130 is configured to create a pressure pocket and re-direct the inflation gas to the closeable vents. The embodiment of the diffuser shown in FIG. 1 at 130 is pentagon shaped and comprises a material 131 which may be integral with a surface of cushion 101 or attached to cushion 101. For example, diffuser 130 may be sewn together with the cushion. Diffuser 130 receives gas via throat 108 through opening 132. Perimeter 133 defines direct opening 134. Direct opening 134 assists with normal inflation of cushion 101 to assist in getting cushion 101 in position in time for dynamic loading purposes. Side openings 135a (not shown in FIG. 1) and 135b are respectively defined by perimeters 136a (not shown in FIG. 1) and 136b. The gas is directed out of direct opening 134 and side openings 135a-135b. Gas directed out of side openings 135a-b is vented out of closeable vents 150a-b. Note that in other embodiments, the optional diffuser may have other shapes. For example, the diffuser may be rectangular, trapezoidal, hexagonal, round, etc. It may also have a portion which is round or elliptical while other portions are angled.

Figure 5:
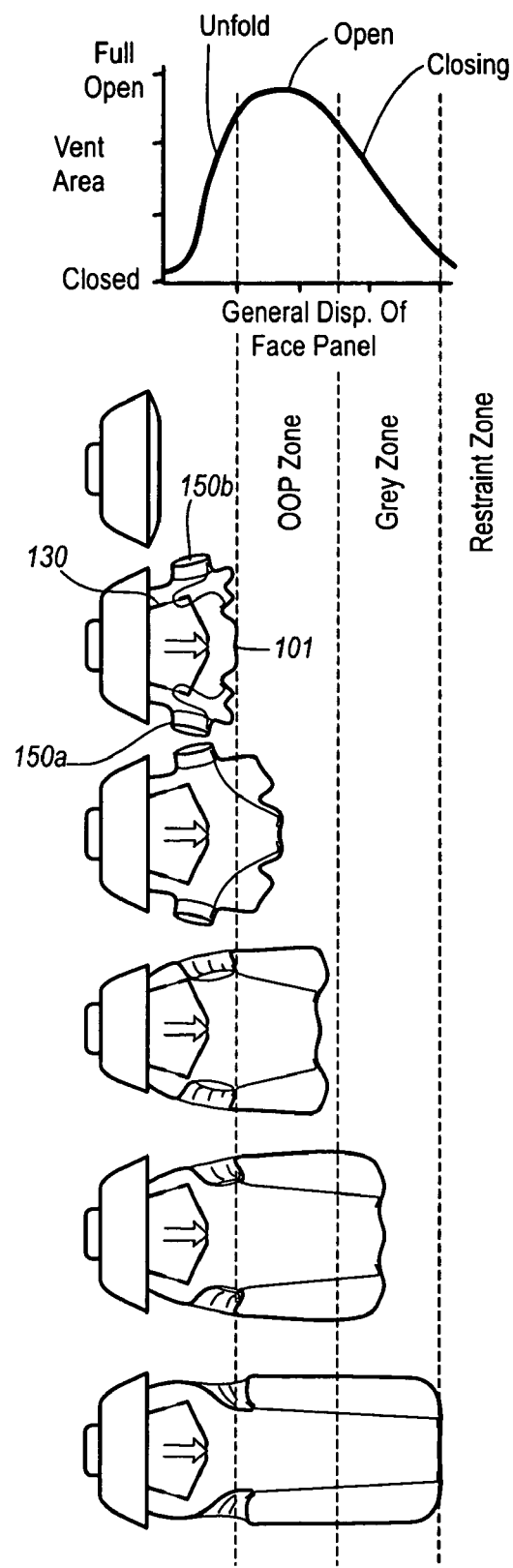
FIG. 5 is a diagram illustrating an airbag cushion venting graph in relation to an airbag cushion's deployment.

Not only are side openings 135a-b strategically located to redirect the gas flow generally toward closeable vents 150a-b and out of cushion 101 but side openings 135a-b, are also sized for optimal gas flow. Side openings 135a-b are large enough to allow most of the gas to flow through them. Only in out-of-position conditions does the focused gas flow from diffuser 130 to the aligned closeable vents 150a-b to allow a more rapid escape of the inflation gas as shown in FIG. 5.

If the occupant is in a normal position and inflation is unrestricted, diffuser 130 functions as normal to re-direct the inflation gas generally toward the vent(s). However, because diffuser 130 and closeable vents 150a-b are independent of each other, the cushion side panels can extend beyond diffuser 130 such that the flow is not aligned or focused with closeable vents 150a-b as shown in FIG. 5. This behavior helps minimize gas leakage. The large vent(s) are quickly closed as the cushion fully expands retaining gas for normal occupant restraint.

Embodiments of the closeable vent are shown in FIGS. 1-9B at 150 which are cinch vents. An additional embodiment of a closeable vent is shown in FIGS. 10A-11B at 150a" and 150b" which is referred to as a laced vent. Laced vents are also disclosed in U.S. patent application Ser. No. 11/528,118 titled AIRBAG CUSHION WITH A LACED VENT TO OPTIONALLY VENT GAS FOR OUT-OF-POSITION CONDITIONS which was filed on Sep. 27, 2006. Cinch vents and other closeable vents are also disclosed in U.S. patent application Ser. No. 11/296,031 titled AIRBAG CUSHION WITH DIFFUSER AND CINCH TUBE TO VENT GAS FOR OUT-OF-POSITION CONDITIONS which was filed on Dec. 7, 2005; U.S. patent application Ser. No. 11/295,953 titled LOCKING MECHANISM FOR A CINCH TUBE TO VENT GAS OF AN AIRBAG CUSHION which was filed on Dec. 7, 2005; U.S. patent application Ser. No. 10/959,256 titled AIRBAG CUSHION WITH VENT FOR REDUCED OUT-OF-POSITION EFFECTS which was filed on Oct. 6, 2004; U.S. patent application Ser. No. 10/959,387 titled AIRBAG CUSHION WITH TETHER DEACTIVATED VENTING FOR REDUCED OUT-OF-POSITION EFFECTS which was filed on Oct. 6, 2004; and U.S. patent application Ser. No. 10/832,843 titled CUSHION VENTING DESIGN FOR OUT OF POSITION OCCUPANT PROTECTION which was filed on Apr. 27, 2004. Other examples of closeable vents referred to as flap vents are also disclosed in U.S. patent application Ser. No. 11/528,266 titled AIRBAG CUSHION WITH A FLAP VENT TO OPTIONALLY VENT GAS FOR OUT-OF-POSITION CONDITIONS which was filed on Sep. 27, 2006. These applications are hereby incorporated by reference.

Cinch tube 150 which is described in more detail below with reference to FIGS. 7A-7B, may comprises a cinch tube 152 with a rim 151. A cord holder such as sleeve 153 with holes referred to as sleeve apertures 154 may be used to hold a vent portion 173 of cord 170. Vent aperture 158 is defined by the inner diameter of tube 152. Cinch vent 150 may be embodied with a generally cylindrical shape. The cinch tube may have any suitable shape such as rectangular, triangular, or polygon shapes. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from cushion membrane tension. The design permits the cinch tube to be a low-stress element in the cushion assembly which is helpful during unfolding of the cushion and pressurization. The cinch tube may comprise a nylon woven fabric-type or other suitable material known in the art.

Figure 6:
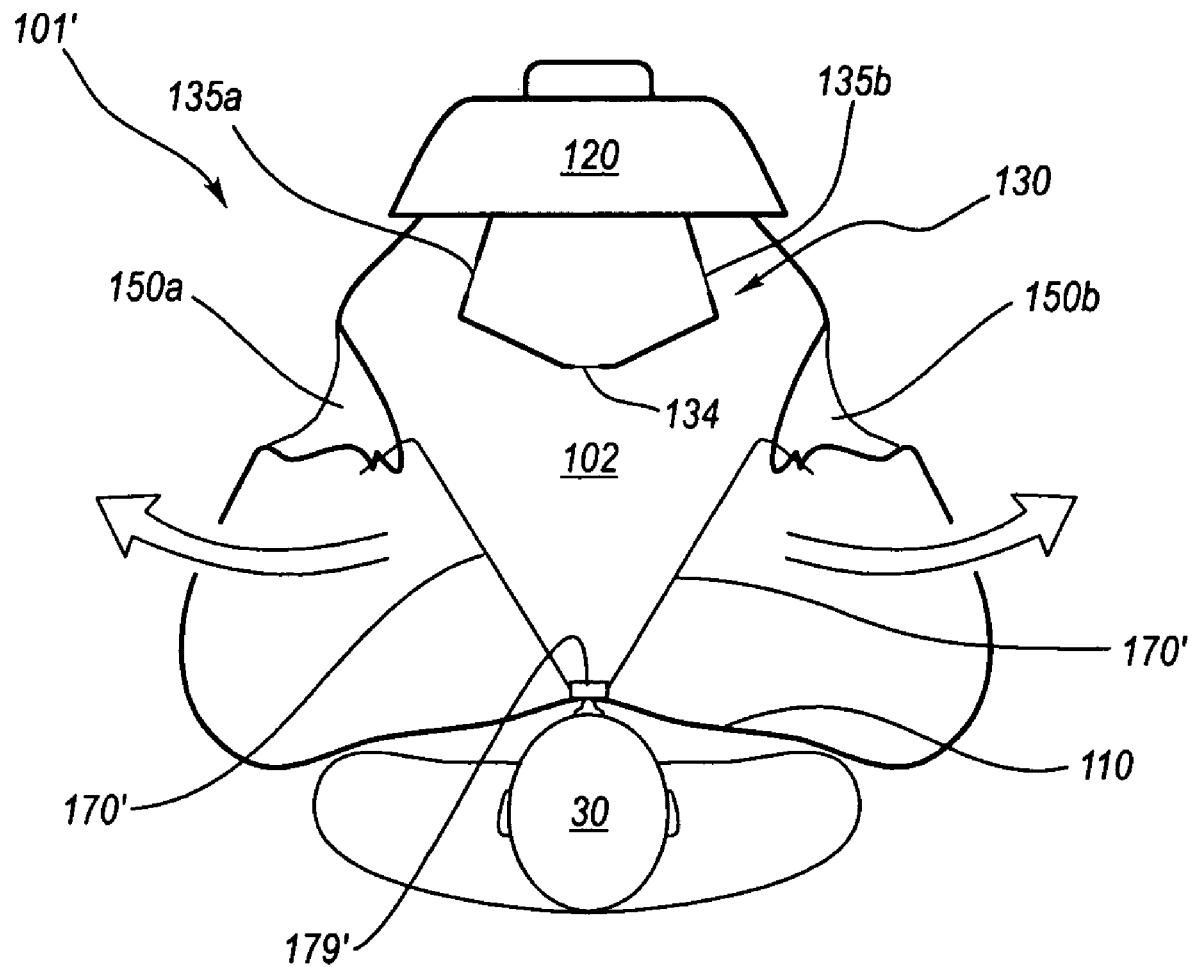
FIG. 6 is a cross-sectional view of an alternative embodiment of a deployed airbag cushion.

As described above, airbag cushion 101 includes a control cord 170. Each cord has a vent portion 173 which is configured to actuate the closeable vent. Cord 170 is configured to move with the expansion of airbag cushion 101 to enable vent portion 173 to close closeable vent 150. One end of cord 170 is connected to vent 170 via stitching 171 and the other end is connected to cushion membrane 110 via a cord attachment 179 which is part of or extends from membrane 110 of airbag cushion 101. Cord attachment 179 serves as an anchor for an end of cord 170. In another embodiment, the cord attachment is stitching between cushion membrane 110 and cord 170. In another embodiment, cord 170 is an integral extension of either cushion membrane 110 or cinch tube 152. Alternatively, cord 170 is not fixedly anchored but is moveably anchored to cushion membrane 110 via cord attachment 179' as shown in FIG. 6 which is essentially a loop that permits movement of cord 170. Other components of another embodiment of a control cord are described with reference to FIG. 8. The cord attachment may be disposed elsewhere such as proximate to a different portion of interior surface 111. Alternatively, the cord attachment may be a portion of exterior surface 112. For example, the cord attachment may be at the bottom of the face surface 113, which is the surface of the airbag cushion directed to the occupant. Thus, cord 170 may extend through the interior 102 of the airbag cushion 101 or may be positioned exterior to the airbag cushion 101. The location of the cord attachment 179 depends on module deployment angle, vehicle interior geometry, and cushion fold type. The cord 170 may comprise a nylon material or other suitable material known in the art.

FIGS. 2A-2C provide a cross-sectional view of an airbag cushion 101 deploying from a housing 10. For illustrative purposes, a single closeable vent 150 is shown in FIGS. 2A-2C but airbag cushion 101 may include multiple vents to provide required +−venting capability as shown in other embodiments.

In FIG. 2A, the initially deploying airbag cushion 101 has a control cord 170 which is slack and the closeable cinch vent 150 remains open. Note the pre-folded configuration in FIG. 2A which is described in more detail with reference to FIGS. 9A-9B. In FIG. 2B, the cord 170 is pulled taut and the closeable vent 150 begins to close. In FIG. 2C, the cord 170 is completely taut and the closeable vent 150 is closed.

Figure 3A:
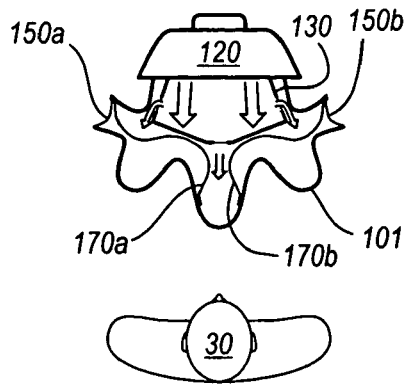
FIG. 3A is a cross-sectional view illustrating initial deployment of an airbag cushion for an occupant in a normal position.
Figure 3B:
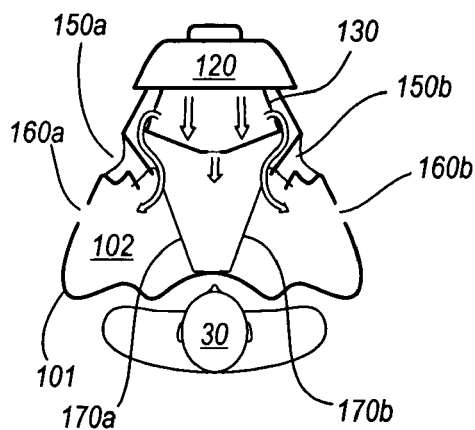
FIG. 3B is a cross-sectional view illustrating a deploying airbag cushion which is partially deployed as it encounters an occupant in a normal position.

Referring to FIGS. 3A and 3B, perspective views of one embodiment of a cinch vent 150 in both the open and closed positions are shown. Cinch cord 170 circumvents a majority of the perimeter of cinch tube 150 in order to properly tighten and restrict the cinch vent 150. Cinch cord 170 has a length that includes an initial free length and a circumference of cinch tube 150. Cinch cord 170 may be disposed within a sleeve 153 that is formed within cinch tube 152. Access to the sleeve 153 is through a sleeve aperture 154 formed in cinch tube 152. Cinch cord 170 enters sleeve aperture 154, feeds through sleeve 154, and is coupled at an end within sleeve 153 to cinch tube 152. Coupling may be achieved by stitches, bonds, adhesives, etc. FIG. 3B shows cord holder 153 gathered together so that rim 151 is collapsed on itself to close cinch tube 150.

Figure 3C:
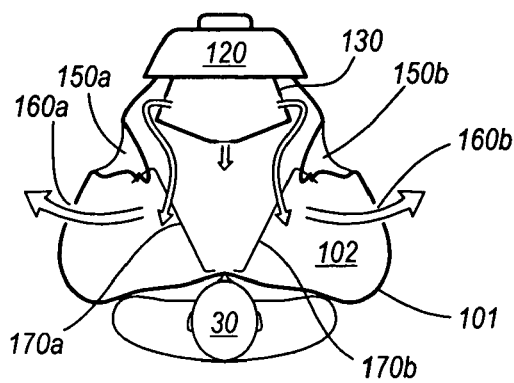
FIG. 3C is a cross-sectional view of an airbag cushion which has closed vents to enable the airbag cushion to fully deploy.

FIGS. 3A-C illustrate three stages of airbag cushion 101 deploying without encountering obstruction in the deploying path. The depicted airbag cushion 101 includes two closeable cinch vents 150a-b symmetrically disposed on the cushion 101 and two fixed vents 160a-b symmetrically disposed on the cushion 101. Fixed vents 160a-b provide consistent venting of the airbag cushion 101 and are not restricted by an occupant's position. In addition to remaining open, fixed vents 160a-b also differ from closeable vents 170a-b as fixed vents 160a-b are typically smaller. Fixed vents 160a-b may be optional in certain cushion embodiments based on venting requirements. The locations for closeable vents 150a-b and fixed vents 160a-b may vary as does the number of vents. An occupant 30 is in a normal seating position which will allow the airbag cushion 101 to fully expand before impacting the occupant. In this manner, the occupant 30 benefits from the full restraint capability of the airbag cushion 101.

In FIG. 3A, the initial breakout of the airbag cushion 101 occurs. The closeable cinch vents 150a-b are open and, in the depicted embodiment, extend from the airbag cushion 101. Because cushion 101 is initially in a folded condition, at initial breakout (such as the initial 7 milliseconds), closeable cinch vents 150a-b are initially non-functional. Because an occupant is not positioned directly in front of the airbag cushion 101 in FIG. 3A, cushion 101 unfolds and is allowed to pressurize normally. In FIG. 3B, cords 170a-b which respectively correspond with cinch vents 150a-b are pulled taut and gas flow through cinch vents 150a-b is restricted. In FIG. 3C, cinch vents 150a-b are completely closed, the gas vents through the fixed vents 160a-b, and normal restraint is provided to the occupant 30.

Figure 4A:
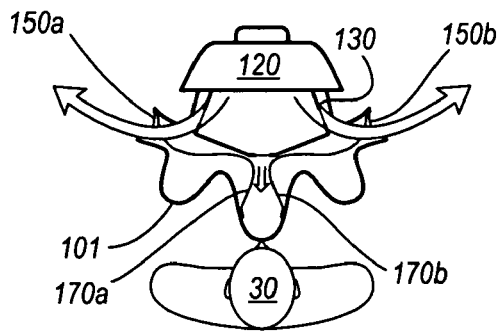
FIG. 4A is a cross-sectional view illustrating initial deployment of an airbag cushion for an out-of-position occupant.
Figure 4B:
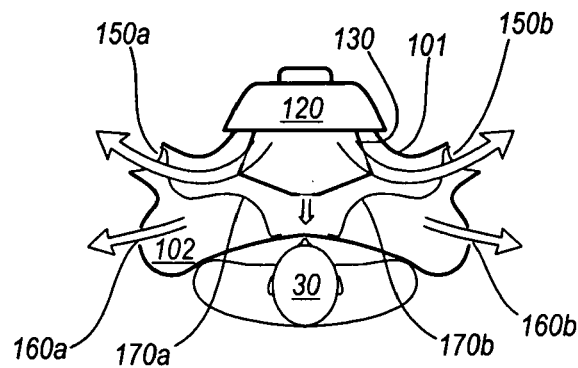
FIG. 4B is a cross-sectional view illustrating a deploying airbag cushion which is only partially deployed as it has encountered an out-of-position occupant.
Figure 4C:
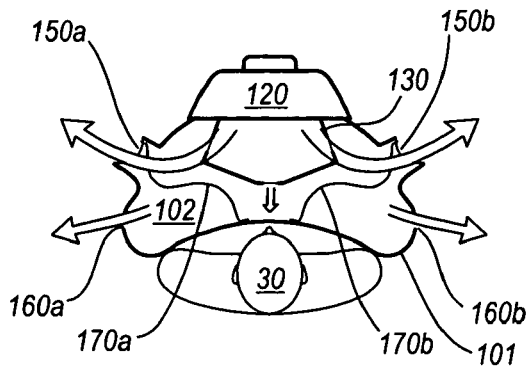
FIG. 4C is a cross-sectional view of an airbag cushion which remains only partially deployed as the closeable vents remain open to prevent full deployment of the airbag cushion.

FIGS. 4A-C illustrate three stages of a deploying airbag cushion 101 with obstruction in the deploying path. An occupant 30 is out-of-position and obstructs the deploying airbag cushion 101 and prevents the airbag cushion 101 from fully inflating. In FIG. 4A, airbag cushion 101 begins initial deployment as in FIG. 3A but encounters occupant 30 causing gas to be vented through fixed vents 160a-b. Fixed vents 160a-b may be located in the side panels of cushion 101 near closeable vents 150a-b, as shown. In FIG. 4B, airbag cushion 101 impacts the occupant 30 and the cords 170a-b remain slack. The closeable vents 150a-b remain open and venting rapidly occurs from cinch vents 150a-b and fixed vents 160a-b. The cushion inflation is restricted and the occupant 30 receives less than the full deployment loading of the cushion 101. In FIG. 4C, cushion 101 is partially inflated and provides limited restraint. Venting continues through cinch vents 150a-b and fixed vents 160a-b.

Referring to FIG. 5, a graph illustrating venting as a function of airbag cushion displacement is shown. For reference, an airbag cushion 101 is shown in various stages of deployment with diffuser 130 and two symmetrically disposed cinch vents 150a-b. During initial deployment, airbag cushion 101 is unfolding and cinch vents 150a-b provide little or no venting. Airbag cushion 101 expands into an out-of-position zone where, if obstructed, the cinch vents 150a-b will remain completely or nearly open and full venting occurs. In this zone an occupant does not receive the full restraint capability but does benefit from limited restraint. If unobstructed, airbag cushion 101 expands into a gray zone where partial closure of the cinch vents 150a-b begins and venting is limited. If further unobstructed, airbag cushion 101 fully expands to the restraint zone. At this zone, cinch vents 150a-b completely close and an occupant benefits from the full restraint capability of airbag cushion 101.

Early in a normal inflation, gas loss through cinch vent 150a-b is minimal even with diffuser 130. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of throat 108. Since pressure outside the cushion is still atmospheric, there is a pressure imbalance and air flows into the cushion, not out of the cushion, when the vent is positioned alongside of the gas flow stream and not in its path.

Referring to FIG. 6, an another embodiment of an airbag cushion 101' is shown. Airbag cushion 101' includes two symmetrical closeable vents 150*a*-*b* that are embodied as described above and have been closed. Rather than having cords corresponding to each closeable vent, a single cord 170' is used. Cord 170' is coupled to or engages each closeable vent in a manner similar to that previously described. Cord 170' passes through a cord attachment 179' which acts as a loop that is coupled to the interior surface 111 of airbag cushion 101. Cord attachment 179' may be formed of a fabric material similar or identical to that of the airbag cushion 101'. Cord 170' may freely pass through cord attachment 179' and may therefore be referred to as a "floating" cord. In an alternative embodiment, the cord may be disposed on the airbag cushion exterior and pass through a cord attachment coupled to an exterior surface 112 of the airbag cushion 101'. Note that upon deployment, the distance from the location of cord attachment 179' to throat 108 is greater than the distance from throat 108 to either closeable vent 150*a*' or 150*b*'.

Figure 7A:
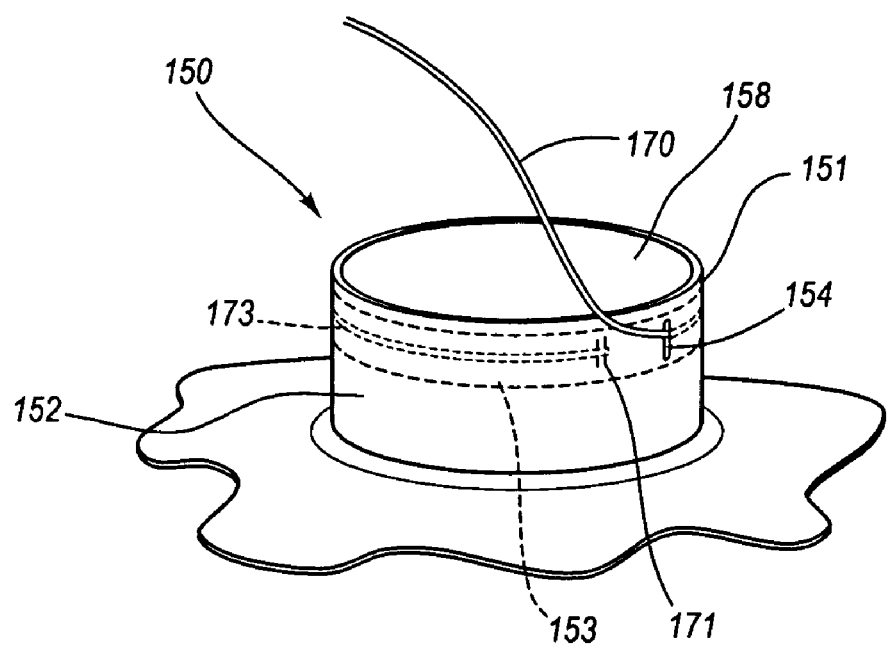
FIG. 7A is a perspective view of an embodiment of a cinch vent before the vent is closed.
Figure 7B:
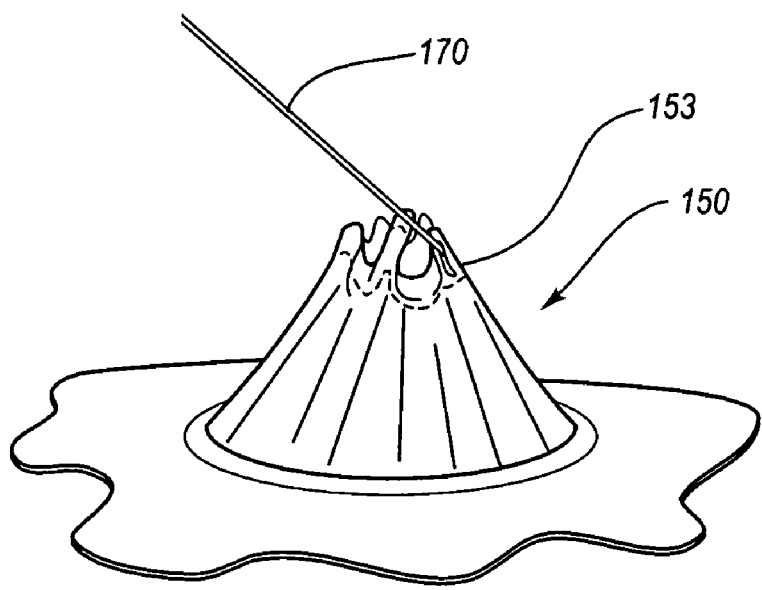
FIG. 7B is a perspective view of the embodiment of the cinch vent shown in FIG. 7A after the vent is closed.

Referring to FIGS. 7A-7B, cinch vent 150 is shown in more detail. Cord 170 has an end held by stitching 171 and a vent portion 173 around the majority of the perimeter of cinch tube 150'. Cinch tube 152 has a sleeve 153 which holds vent portion 173 of cord 170. Vent portion 173 enters sleeve 153 via sleeve aperture 154. As shown in FIG. 7B, sleeve 153 is gathered together when cord 170 has been pulled taut. By causing cinch tube 152, particularly rim 151, to collapse on itself, cinch vent 150 is closed. In other embodiments, sleeve 153 features numerous apertures to facilitate cinching or a plurality loops or tabs may collectively act as a cord holder. Optional tack stitching may be used to retain cord 170 and prevent inadvertent closing of the cinch vent 150 during shipping and handling. Such tack stitching is designed to be easily broken and provides no interference to airbag cushion deployment.

Figure 8:
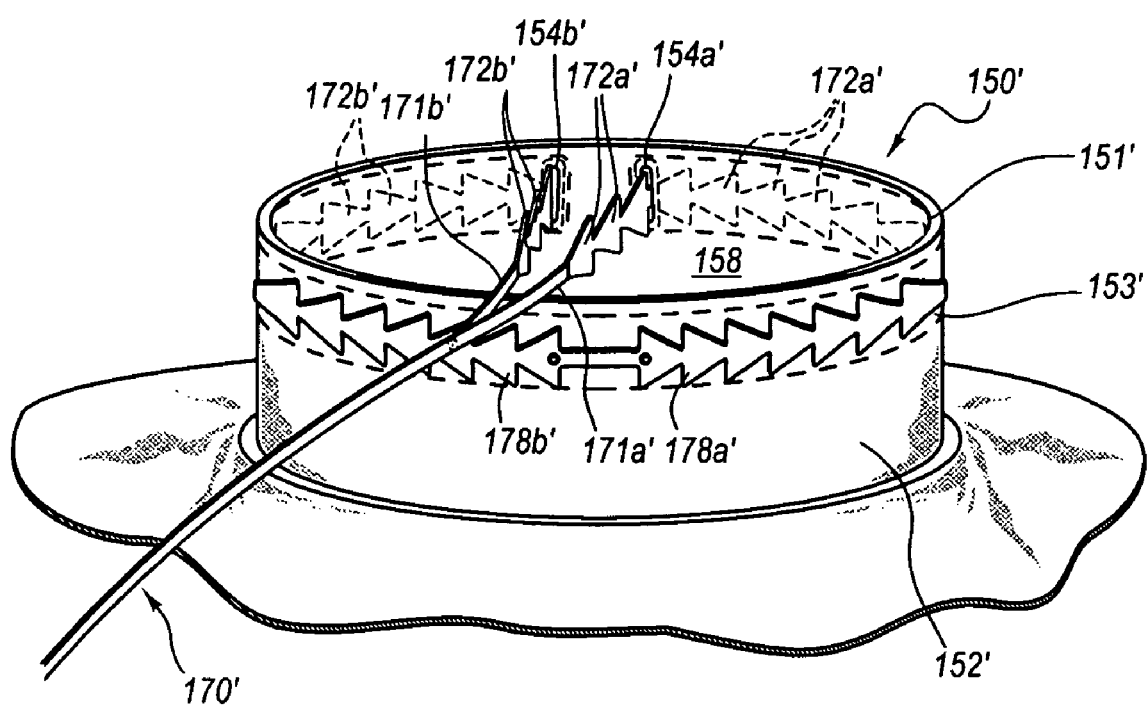
FIG. 8 is a perspective view of another embodiment of a cinch tube and a cord with multiple flat-wedged stoppers extending through two sleeve apertures to incrementally cinch the tube in two directions.

FIG. 8 depicts cord 170' which incrementally cinches in two directions. Cinch vent 150' is shown with a cinch tube 152 featuring apertures 154*a*'-*b*', which may be optionally reinforced. Cord 170' has stoppers 172*a*'-*b*'. During deployment, both sections 171*a*'-*b*' are respectively pulled through apertures 154*a*'-*b*' ensuring a positive lock of the sections of the disposed cord at apertures 154*a*'-*b*'. The stopper may have any suitable configuration such as a conical shape with a flared surface which terminates at a base configured to act as a brace surface. The depicted stoppers have a flat-wedged shape with opposing teeth 178' which is the region at the flared end of the stopper defined by the flared surface and the base. As each stopper 172 *a*'-*b*' passes through the respective sleeve aperture, cinch cord 170' is held in place and the diameter of cinch tube 152' is incrementally decreased. In operation, stoppers 172*a*'-*b*' prevent cinch tube 150' from reopening after deployment and closure of the cinch tube 150'. This may occur during deflation of an airbag cushion as the cinch cord becomes slack. Venting is thereby directed to other vents. These embodiments permit a positive lock of the cinch cord to be attained regardless of the amount of displacement of the cord through the sleeve of the cinch tube even at its maximum displaced position through the sleeve of the cinch tube. Of course, other embodiments of a cord with multiple stoppers can also be used to maintain cinch tube closure so that once closed or partially closed the cinch tube does not re-open.

Figure 9A:
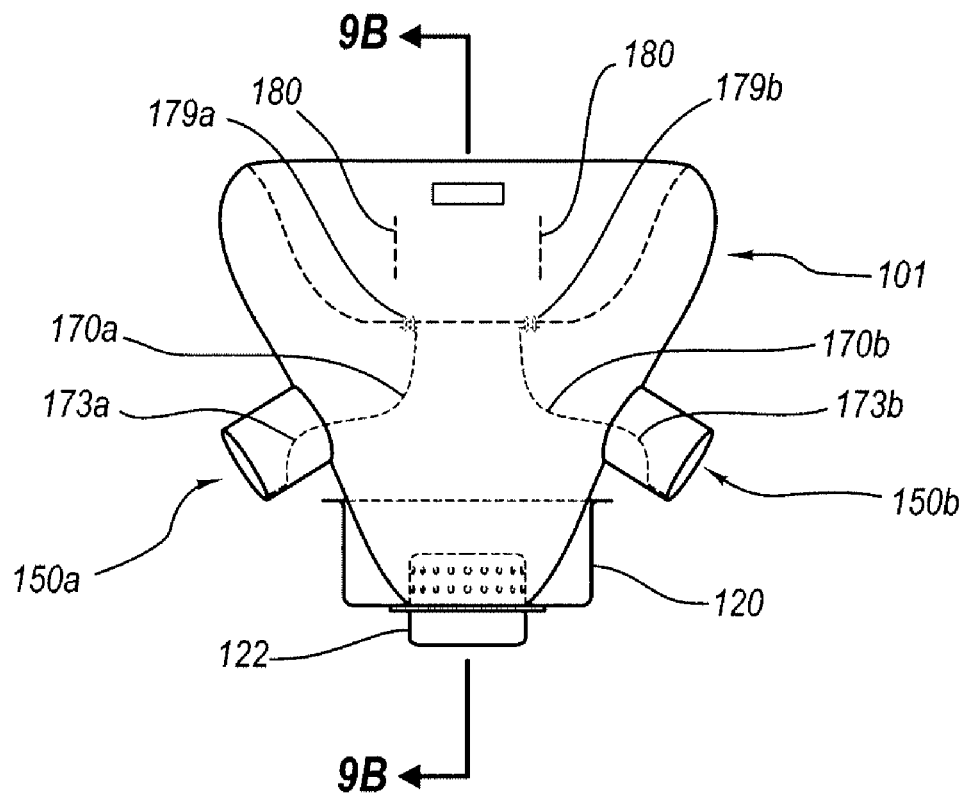
FIG. 9A is a top plan view of an airbag which has its front portion folded and held in place by breakaway stitching in preparation for being further folded for placement in an automobile.
Figure 9B:
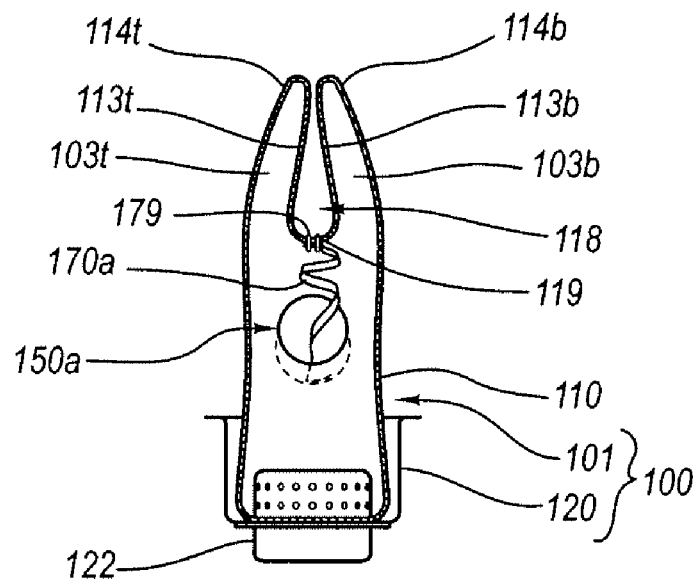
FIG. 9B is a cross-sectional view of the partially folded airbag shown in FIG. 9A with the front portion divided into a top section and a bottom section by a fold. The cross-sectional view is taken along cutting line 9B-9B in FIG. 9A.

FIGS. 9A-9B and FIG. 2A depict an airbag cushion 101 which has a fold 118 held initially by an optional tack stitch 180 that is advantageous to prevent undesired closure of the closeable vents during shipping or handling and to ensure that the cord remains slack during initial deployment of the airbag. Tack stitch 180 is designed to easily and consistently break during deployment and to provide no interference to airbag cushion deployment. While only a single fold is shown, other embodiments may have more than at least one fold.

The region of membrane 110 where cords 170*a*-*b* extend from membrane 110 is tucked inside the main body of airbag cushion 101. Fold 118 has a base 119 which, as shown in FIG. 9B, may corresponds with the location of the cord attachment(s). After tack stitch 180 ruptures and the folded portion of membrane 110 at fold 118 unfolds as shown in FIG. 2A, cords 170*a* and 170*b* move from a slack condition to a tensioned condition. Then, as discussed above with reference to FIGS. 2B-2C, cords 170*a* and 170*b* become fully tensioned and close closeable vents 150*a* and 150*b* to enable airbag cushion 101 to become fully inflated in the absence of an out-of-position occupant blocking deployment.

Due to fold 118, front portion 102*f* of interior 102 is divided into a top section 103*t* and a bottom section 103*b* as shown in FIGS. 8A-8B and 9A. As also shown in FIGS. 8A-8B and 9A, a top section 113*t* and a bottom section 113*b* of face surface 113 are opposite each other when airbag cushion 101 is folded. FIGS. 8B and 9A also identify tips 114*t* and 114*b* which are opposite each other when airbag cushion 101 is folded but move away from each other as the airbag cushion 101 is inflated.

Other structures may also be used to ensure that cords 170*a* and 170*b* remain initially slack during the early stages of the airbag deployment and remain loose during shipping and handling. Other examples of releasable temporary holding features which ensure that the cords do not prematurely actuate the gas venting features include fasteners, adhesives, clips, knots, hook and loop fasteners, etc. Such releasable temporary holding features are examples of means for temporarily and releasably holding a portion of an airbag in a folded configuration.

FIGS. 10A-10B and FIGS. 11A-11B depict an airbag cushion 101" with another embodiment of a closeable vent. Closeable laced vents 150*a*"-150*b*" comprise opposing vent sides 152*a*"-152*b*". Opposing sides 152*a*"-152*b*" have holes 154*a*"-154*b*" which receive the vent portion 173*a*"-173*b*" of cord 170*a*"-170*b*" in a single laced configuration. The opposing sides 152*a*"-152*b*" come together at ends 156*a*"-156*b*". Sides 152*a*"-152*b*" are located around a vent aperture 158*a*"-158*b*" in the membrane 110 of the inflatable airbag cushion 101. Vent aperture 158*a*"-158*b*" is defined by edges 151*a*"-151*b*" of sides 152*a*"-152*b*". The closeable laced vent may be reinforced as needed with a suitable material such as a nylon woven fabric-type or other material known in the art. For example, optional panel strips may also be used to reinforce sides 152*a*"-152*b*" or a sleeve may be formed to assist in reducing surface tension when under pressure.

Closeable laced vents 150*a*"-150*b*" may be formed by cutting a slit in membrane 110 or by removing a portion of membrane 110. Closeable laced vents may also be formed which are co-linear with a seam of the airbag, such as seam 116 in FIG. 1 by not seaming the opposing portions of material together. The vent aperture of the closeable vent may have any suitable shape. Vent portions 173a"-173b" may also have other configurations. For example, vent portions 173a"-173b" may extend diagonally across vent apertures 158a"-158b" in a double laced configuration like a shoelace without retention knots 171a"-171b". Note that in such a double laced configuration, neither end of the control cord is necessarily attached to a closeable vent.

Airbag cushion 101" depicted in FIGS. 10A-10B and FIGS. 11A-11B has a fold 118 which is essentially identical to fold 118 depicted in FIG. 2A and FIGS. 9A-9B. Fold 118 airbag cushion 101" is also held initially by an optional tack stitch 180 to prevent undesired closure of the closeable vents during shipping or handling and to ensure that the cord remains slack during initial deployment of the airbag. The area of membrane 110 connected to cords 170a"-170b" is tucked inside the main body of airbag cushion 101.

FIGS. 11A-11B shows airbag cushion 101" with front portion 102f of interior 102 divided into a top section 103t and a bottom section 103b. Top section 113t and a bottom section 113b of face surface 113 are opposite each other when airbag cushion 101 is folded. Tips 114t-114b which are opposite each other when airbag cushion 101 is folded, as shown in FIG. 11A, move away from each other as the airbag cushion 101 is inflated as shown in FIG. 11B.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Various embodiments for closeable vents have been disclosed herein. The closeable vents disclosed herein are examples of means for venting gas out of the airbag. The combination of a closeable vent and a control cord, as disclosed herein, is an example of means for restricting gas venting by closing the venting means to reduce the aperture of the venting means upon inflatable airbag deployment without obstruction and enabling the venting means to remain open upon inflatable airbag deployment with obstruction. The combination of a sleeve of a cinch tube and a cinch cord with a plurality of stoppers, as disclosed herein, is an example of means for restricting gas venting by incrementally cinching the venting means to reduce the circumference of the venting means upon inflatable airbag deployment without obstruction and enabling the venting means to remain open upon inflatable airbag deployment with obstruction. The diffusers disclosed herein are examples of means for diffusing gas by re-directing inflation gas to the venting means from an inflator such that the gas rapidly exits the inflatable airbag cushion via the venting means when deployment of the airbag is obstructed.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag module, comprising:
   an inflatable airbag cushion having a cushion membrane;
   a first closeable vent having a first vent aperture in the cushion membrane of the inflatable airbag cushion;
   a second closeable vent having a second vent aperture in the cushion membrane of the inflatable airbag cushion; and
   at least one cord anchored to the cushion membrane of the inflatable airbag cushion and having a first vent portion and a second vent portion,
      wherein the first closeable portion and the second closeable portion respectively engage the first closeable vent and the second closeable vent in a configuration such that, upon deployment of the inflatable airbag cushion with obstruction, the cord does not fully extend and the first closeable vent and the second closeable vent remain open, and upon deployment of the inflatable airbag cushion without obstruction, the cord extends and at least partially closes the first closeable vent and the second closeable vent;
      wherein the cord is anchored to the cushion membrane at a region of the cushion membrane which is folded to have at least one fold, and
      wherein the fold is held in place by a releasable temporary holding feature.

2. The airbag module of claim 1, wherein the cord is anchored to the cushion membrane via a cord attachment.

3. The airbag module of claim 1, wherein the cord is fixedly anchored to the cushion membrane.

4. The airbag module of claim 1, wherein the cord is moveably anchored to the cushion membrane.

5. The airbag module of claim 1, wherein the cord is anchored to the cushion membrane at a location corresponding with a base of the fold.

6. The airbag module of claim 1, wherein the releasable temporary holding feature is stitching.

7. An airbag module, comprising:
   an inflatable airbag cushion having a cushion membrane;
   a first closeable vent having a first vent aperture in the cushion membrane of the inflatable airbag cushion;
   a second closeable vent having a second vent aperture in the cushion membrane of the inflatable airbag cushion; and
   at least one cord anchored to the cushion membrane of the inflatable airbag cushion and having a first vent portion and a second vent portion,
      wherein the first closeable portion and the second closeable portion respectively engage the first closeable vent and the second closeable vent in a configuration such that, upon deployment of the inflatable airbag cushion with obstruction, the cord does not fully extend and the first closeable vent and the second closeable vent remain open, and upon deployment of the inflatable airbag cushion without obstruction, the cord extends and at least partially closes the first closeable vent and the second closeable vent;
      wherein the cushion membrane is folded to have at least one fold held by stitching, and
      wherein the cord is anchored to the cushion membrane at a location corresponding with a base of the fold.

8. The airbag module of claim 7, wherein the cord is anchored to the cushion membrane via a cord attachment.

9. The airbag module of claim 7, wherein the cord is fixedly anchored to the cushion membrane.

10. The airbag module of claim 7, wherein the cord is moveably anchored to the cushion membrane.

11. An airbag module, comprising:
an inflatable airbag cushion having a cushion membrane;
at least one closeable vent; and
a cord anchored to the cushion membrane of the inflatable airbag cushion and having a vent portion positioned at the closeable vent such that upon deployment of the inflatable airbag cushion with obstruction, the cord does not fully extend and the vent remains open, and upon deployment of the inflatable airbag cushion without obstruction, the cord extends and at least partially closes the vent;
wherein the cord is anchored to the cushion membrane at a region of the cushion membrane which is folded to have at least one fold, and wherein the fold is held in place by a releasable temporary holding feature; and
wherein the fold is located at a front portion of cushion membrane.

12. The airbag module of claim 11, wherein the cord is anchored to the cushion membrane via a cord attachment.

13. The airbag module of claim 11, wherein the cord is fixedly anchored to the cushion membrane.

14. The airbag module of claim 11, wherein the cord is moveably anchored to the cushion membrane.

15. The airbag module of claim 11, wherein the cord is anchored to the cushion membrane at a location corresponding with a base of the fold.

16. The airbag module of claim 11, wherein the releasable temporary holding feature is stitching.

17. The airbag module of claim 11, wherein the releasable temporary holding feature prevents closure of the closeable vent during shipping or handling and ensure that the cord remains slack during initial deployment of the airbag module.

18. The airbag module of claim 11, further comprising a diffuser configured to re-direct inflation gas to the closeable vent from an inflator such that the gas rapidly exits the inflatable airbag cushion via the closeable vent when deployment of the airbag is obstructed.

19. The airbag module of claim 11, further comprising a fixed vent disposed on the airbag and adapted to vent gas during airbag deployment with and without obstruction.

20. An airbag module, comprising:
an inflatable airbag cushion having a cushion membrane;
at least one closeable vent; and
a cord anchored to the cushion membrane of the inflatable airbag cushion and having a vent portion positioned at the closeable vent such that upon deployment of the inflatable airbag cushion with obstruction, the cord does not fully extend and the vent remains open, and upon deployment of the inflatable airbag cushion without obstruction, the cord extends and at least partially closes the vent;
wherein the cord is anchored to the cushion membrane at a region of the cushion membrane which is folded to have at least one fold, and wherein the fold is held in place by a releasable temporary holding feature; and
wherein the releasable temporary holding feature is stitching.

21. The airbag module of claim 20, wherein the cord is anchored to the cushion membrane via a cord attachment.

22. The airbag module of claim 20, wherein the cord is fixedly anchored to the cushion membrane.

23. The airbag module of claim 20, wherein the cord is moveably anchored to the cushion membrane.

24. The airbag module of claim 20, wherein the cord is anchored to the cushion membrane at a location corresponding with a base of the fold.

25. The airbag module of claim 20, wherein the releasable temporary holding feature prevents closure of the closeable vent during shipping or handling and ensure that the cord remains slack during initial deployment of the airbag module.

26. The airbag module of claim 20, further comprising a diffuser configured to re-direct inflation gas to the closeable vent from an inflator such that the gas rapidly exits the inflatable airbag cushion via the closeable vent when deployment of the airbag is obstructed.

27. The airbag module of claim 20, further comprising a fixed vent disposed on the airbag and adapted to vent gas during airbag deployment with and without obstruction.

28. An airbag module, comprising:
an inflatable airbag cushion having a cushion membrane;
at least one closeable vent; and
a cord anchored to the cushion membrane of the inflatable airbag cushion and having a vent portion positioned at the closeable vent such that upon deployment of the inflatable airbag cushion with obstruction, the cord does not fully extend and the vent remains open, and upon deployment of the inflatable airbag cushion without obstruction, the cord extends and at least partially closes the vent;
wherein the cord is anchored to the cushion membrane at a region of the cushion membrane which is folded to have at least one fold, and wherein the fold is held in place by a releasable temporary holding feature; and
wherein the releasable temporary holding feature prevents closure of the closeable vent during shipping or handling and ensure that the cord remains slack during initial deployment of the airbag module.

29. The airbag module of claim 28, wherein the cord is anchored to the cushion membrane via a cord attachment.

30. The airbag module of claim 28, wherein the cord is fixedly anchored to the cushion membrane.

31. The airbag module of claim 28, wherein the cord is moveably anchored to the cushion membrane.

32. The airbag module of claim 28, wherein the cord is anchored to the cushion membrane at a location corresponding with a base of the fold.

33. The airbag module of claim 28, further comprising a diffuser configured to re-direct inflation gas to the closeable vent from an inflator such that the gas rapidly exits the inflatable airbag cushion via the closeable vent when deployment of the airbag is obstructed.

34. The airbag module of claim 28, further comprising a fixed vent disposed on the airbag and adapted to vent gas during airbag deployment with and without obstruction.

35. An airbag module, comprising:
an inflatable airbag cushion having a cushion membrane;
at least one closeable vent;
a cord anchored to the cushion membrane of the inflatable airbag cushion and having a vent portion positioned at the closeable vent such that upon deployment of the inflatable airbag cushion with obstruction, the cord does not fully extend and the vent remains open, and upon deployment of the inflatable airbag cushion without obstruction, the cord extends and at least partially closes the vent; and
a diffuser configured to re-direct inflation gas to the closeable vent from an inflator such that the gas rapidly exits the inflatable airbag cushion via the closeable vent when deployment of the airbag is obstructed;
wherein the cord is anchored to the cushion membrane at a region of the cushion membrane which is folded to have at least one fold, and wherein the fold is held in place by a releasable temporary holding feature.

36. The airbag module of claim 35, wherein the cord is anchored to the cushion membrane via a cord attachment.

37. The airbag module of claim 35, wherein the cord is fixedly anchored to the cushion membrane.

38. The airbag module of claim 35, wherein the cord is moveably anchored to the cushion membrane.

39. The airbag module of claim 35, wherein the cord is anchored to the cushion membrane at a location corresponding with a base of the fold.

40. The airbag module of claim 35, further comprising a fixed vent disposed on the airbag and adapted to vent gas during airbag deployment with and without obstruction.

* * * * *

UNITED STATES PATENT AND TRADEMARK OFFICE
CERTIFICATE OF CORRECTION

PATENT NO. : 7,614,653 B2 Page 1 of 1
APPLICATION NO. : 11/528265
DATED : November 10, 2009
INVENTOR(S) : Rose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this

Nineteenth Day of October, 2010

David J. Kappos
*Director of the United States Patent and Trademark Office*